April 17, 1956 G. FRANCIS 2,742,164
AUTOMATIC AUTOMOBILE PARKING FACILITY
Filed April 6, 1954 6 Sheets-Sheet 4

INVENTOR.
GEOFFREY FRANCIS.
BY
Wm. H. Atkinson
ATTORNEY

INVENTOR.
GEOFFREY FRANCIS
BY
ATTORNEY

April 17, 1956 G. FRANCIS 2,742,164
AUTOMATIC AUTOMOBILE PARKING FACILITY
Filed April 6, 1954 6 Sheets-Sheet 6

INVENTOR.
GEOFFREY FRANCIS.
BY
ATTORNEY

United States Patent Office 2,742,164
Patented Apr. 17, 1956

2,742,164

AUTOMATIC AUTOMOBILE PARKING FACILITY

Geoffrey Francis, San Francisco, Calif., assignor to Gorman Francis Corp., San Francisco, Calif., a corporation of California Application April 6, 1954, Serial No. 421,330

7 Claims. (Cl. 214—16.1)

My present invention relates to an automobile parking facility, and more particularly to a device of the character described and claimed in my co-pending application, Serial No. 286,221, filed May 5, 1952 and which has issued as Patent No. 2,682,958 entitled Automobile Parking Facility.

An object of my invention is to provide a parking facility by which a plurality of automobiles can be conveniently parked in tiers one above the other with a minimum of space requirement, to the end that land areas in congested metropolitan districts may be used for temporary automobile parking in an efficient, economical and practical manner.

Another object of the invention is to provide a parking facility of the type employing a plurality of flights or lifts upon which individual automobiles may be parked and maneuvered up and down in two adjacent tiers by the employment of two vertical driving screws with a transfer mechanism for shifting the automobiles from one tier to the other at the top and bottom of the screw and operated by a single source of motive power.

A further object of the invention is to provide an automobile storing and/or parking facility in which the automobiles may be stored and/or parked upon individual flights or lifts that move vertically up or down on one side of a supporting structure while similar flights or lifts are respectively moved down or up on the other side of the supporting structure.

Another object of the invention is to provide an automobile parking facility employing automobile supporting flights or lifts that move upwardly along one side of a supporting structure and downwardly at the other side of said structure and in which the flights or lifts with or without an automobile thereupon may be moved and transposed in either direction from one to the other side of said structure at the top and bottom thereof in a new, novel and efficient manner.

Another object of the invention is to provide a tier type automobile parking facility having vertically extending flight or lift guiding trackways and a novel transition arrangement at its top and bottom for transferring automobile supporting flights or lifts from one tier to the other and in synchronized relation with the vertical movement of said flights and lifts.

A further object of the invention is to provide a practical and efficient automobile parking facility employing a pair of vertically extending jack screws operating in synchronized relation for raising and lowering automobile carrying flights or lifts along vertically extending trackways mounted in parallel relation at opposite sides of a supporting structure to provide ascending and descending paths of travel for the automobile carrying flights or lifts as they are moved by said jack screws.

Another object of the invention is to provide a parking facility of the type contemplated by my above identified prior application in which two oppositely operating jack screws are employed with a novel mechanism by which the flights or lifts with or without automobiles are transferred from one jack screw to the other at the upper and lower ends thereof.

Other objects and advantages will be in part evident to those skilled in the art and in part pointed out hereinafter in connection with the accompanying drawings wherein there is shown by way of illustration and not of limitation a practical embodiment of the invention.

Figure 1:
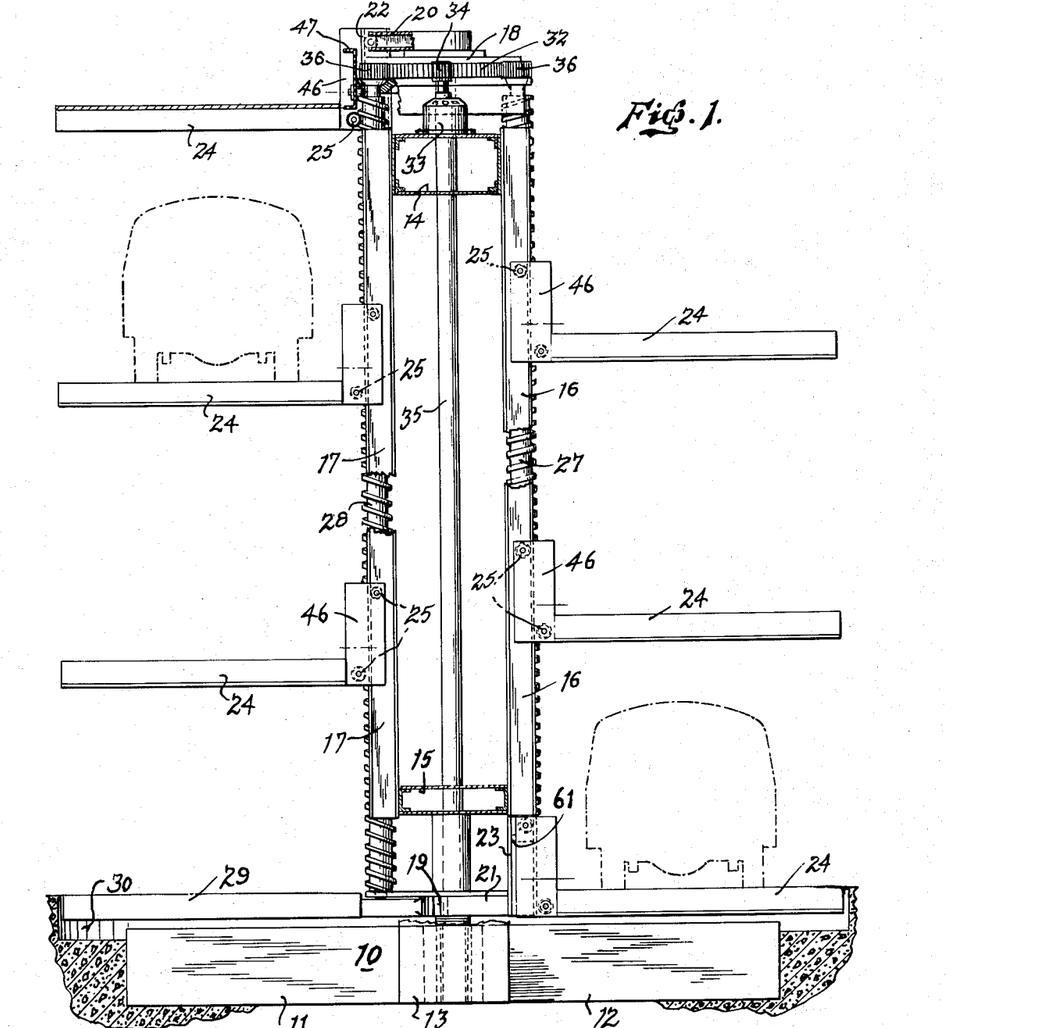
Figure 1 is a front view of a device constructed in accordance with a preferred form of my present invention.
Figure 2:
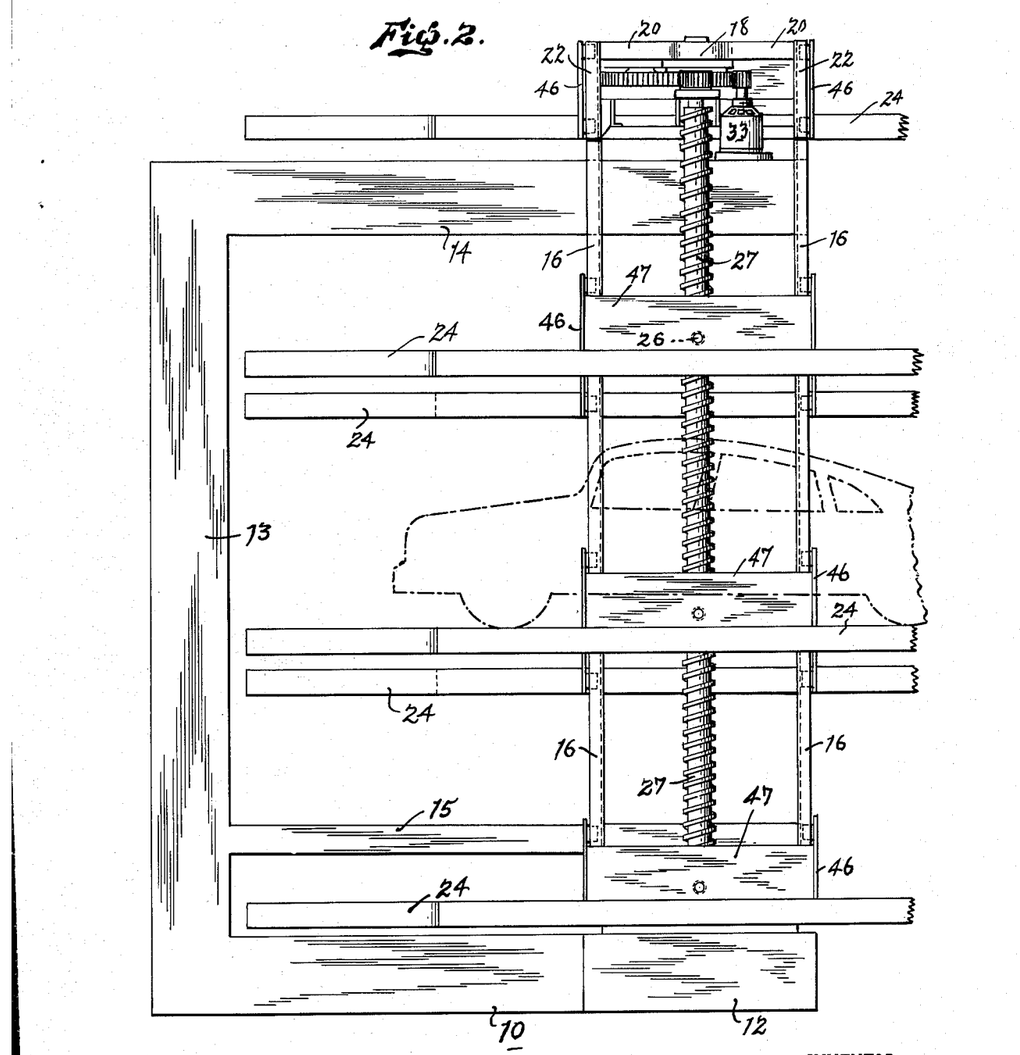
Figure 2 is a side view of the device looking toward the left of Figure 1.
Figure 3:
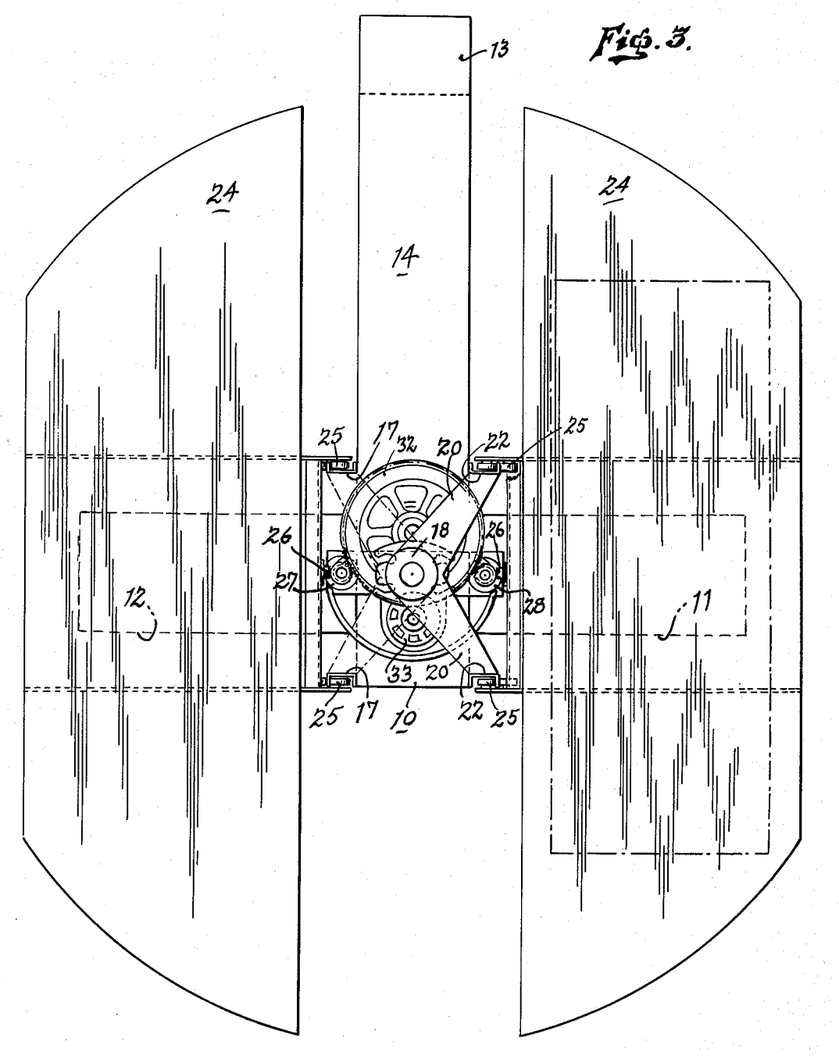
Figure 3 is a plan view of the device as shown in Figures 1 and 2 of the drawings.

For a general description of the invention, reference is first made to Figures 1, 2 and 3 of the drawings from which it will be seen that the structure here disclosed is similar in some respects to the apparatus illustrated, described and claimed in my above identified co-pending application for patent. In this particular arrangement, like that of my earlier application, the apparatus comprises a vertical extending supporting structure, having open ended trackways disposed vertically along opposite sides thereof, and at the end of these trackways there is a transition or transfer mechanism by which a plurality of automobile or load accommodating platforms or lifts after moving in spaced relation along one of said vertically disposed trackways are transferred one at a time from one to the other of said trackways at both the top and bottom of the supporting structure. A major difference to be found in the present disclosure is the employment of vertically extending jackscrews as a driving means for the automobile accommodating platforms or lifts which move vertically in their travel along the trackways at opposite sides of the supporting structure. A further difference will also be found in the means by which these platforms or lifts are moved or transferred from a trackway at one side of the supporting structure to the trackway at the other side thereof.

As illustrated in these figures of the drawings the present device employs a fabricated steel supporting structure having a horizontal base portion 10 with laterally extending base members 11 and 12 and a vertical extending column 13 having horizontally extending jibs or arms 14 and 15 which form spaced supports for the rails of two vertical extending trackways 16 and 17 at opposite sides thereof. These trackways 16 and 17 are open at their upper and lower ends and associated with the ends of these trackways 16 and 17 respectively at their upper and lower ends, there are rotatable bolsters 18 and 19 which have angularly extending arms 20 and 21 that support short lengths of trackway 22 and 23. When the apparatus is in operation these bolsters are adapted and arranged to move the short lengths of trackway 22 and 23 from one to the other side of the supporting structure and into aligned relationship with the open ended trackways 16 and 17. In the present drawing there are six automobile supporting platforms or lifts 24 upon each one of which an automobile may be parked. The platforms or lifts 24 are supported on the trackways 16 and 17 in cantilever fashion in much the same manner as are the lifts of a fork-lift truck and to this end they are each equipped with upper and lower sets of rollers 25 that engage opposite sides of a flange of the channel irons that form the rails of the vertically extending trackways 16 and 17. Midway between these rollers 25 the platforms or lifts 24 also have means in the form of rollers 26 which, as is more clearly shown in Figures 6 and 8 of the drawings, extend from the platforms and engage with the threads of two vertical extending jackscrews 27 and 28 which as previously stated, are employed as a driving means for moving the platforms or lifts 24 upwardly and/or downwardly at opposite sides of the supporting structure 10. In this operation the direction of movement of the platforms 24 will be determined by which of the jackscrews 27 or 28 is engaged by the roller 26 of a particular platform or lift. Associated with and supported by the rotatable bolster 19 at the base of the supporting structure 10 there is also a horizontally disposed movable platform 29 which, as will be clearly seen from an inspection of Figure 1 of the drawings, serves to provide a drive-over surface at one or the other side of the supporting structure 10 as the rotatable bolster 19 operates to transfer a platform or lift 24 from one of the trackways 16 or 17 to the other. In the present instance, the lowermost platform 24 is shown as supported by the bolster 19 in alignment with trackway 16 while the drive-over platform 29 is located at the opposite side of the supporting structure 10. In the preferred arrangement, it is contemplated that the lowermost lift platform 24 and the drive-over platform 29 will turn within a circular pit 30 when being rotated from one side of the apparatus to the other. In this way the movable platform 29 will provide a supporting surface over which an automobile may be driven across the pit 30 should occasion therefor arise. One such instance would be where a similar parking device might be located in alignment directly at the rear of the one here illustrated. Likewise the lowermost platform 24 when empty may also be used as a driveway for maneuvering an automobile thereover to a point beyond or onto a second similar parking device where several are in use in a particular parking lot.

As is clearly shown, the lift platforms 24 are preferably rounded at their ends to conform with the radius of the pit 30. The bolster 18 at the top of the supporting structure 10 is also here shown with its diagonally extending arms 20 supporting the short lengths of rail 22 which are alternately brought into co-axial or registering relation with one or the other of the vertically disposed open ended trackways 16 and 17. As will be hereinafter pointed out in more detail, these bolsters 18 and 19 operate intermittently and at a time when a supporting platform 24 is positioned open or is free of engagement with the short lengths of rail 22 and 23 carried thereby. In the present instance the gear ratios illustrated provide for one idle revolution of the bolsters 18 and 19 between each actual transfer of a platform 24 from one trackway to the other. However, it will be evident that the gearing might be so proportioned that the bolsters 18 and 19 will operate only when a platform 24 is to be transferred from one to the other side of the supporting structure 10. As a means for turning the bolsters 18 and 19, there is a ring gear 32 that is driven by an electric motor 33 through a pinion 34. The bolster 18 is secured upon a vertical extending shaft 35 which also supports and serves as driving connection for the bolster 19 at the bottom of the supporting structure 10. As will be seen the ring gear 32 provides a driving connection between the intermittent transfer mechanism that turns the bolsters 18 and 19 and also the jackscrews 27 and 28 which are here shown respectively as having pinions 36 at their upper ends. When the jackscrew 27 is turning from right to left, as viewed in Figure 1 of the drawings, it will operate to raise the platforms 24 on the right side of the supporting structure, whereas the jackscrew 28 with a reverse lead and turning in the same direction will operate to control the descent of the platforms 24 at the left side of the supporting structure.

Figure 4:
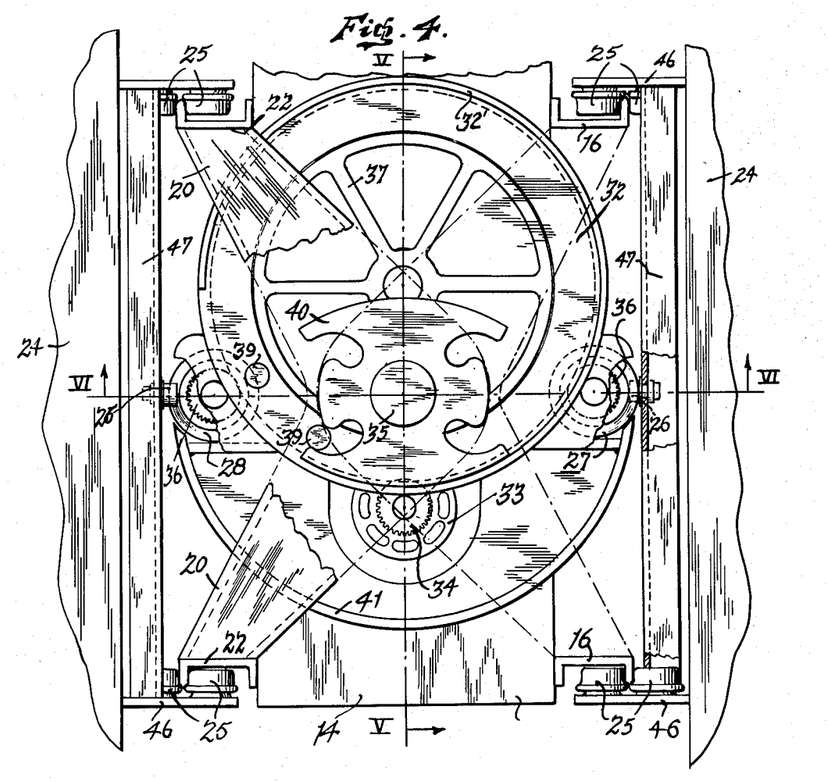
Figure 4 is an enlarged fragmentary plan view of the transfer mechanism as illustrated in Figure 3 of the drawings.

By now referring to Figure 4 of the drawings it will be seen that the ring gear 32 is mounted to turn about a hub or web-like structure 37 that is fixed in a stationary manner upon a supporting column 38 carried by the extending arm 14 of the supporting structure 10. This ring gear 32 has an outer upstanding flange 32' that extends about its perimeter, as here illustrated, for a total of 270° with a 90° gap in the lower left hand quarter thereof. Located within the limits of the 90° gap the ring gear 32 also carries two upstanding pins 39 which operate in a manner well understood in the art to turn a star wheel 40.

This star wheel 40 is keyed upon the upper end of the vertical extending shaft 35 and turns the shaft 35 through a half revolution during this particular quarter revolution of the ring gear 32. In this manner, there is provided an intermittent drive between the motor 33 and the bolsters 18 and 19 at the upper and lower ends of the vertical shaft 35. In this connection, it will be understood that the upstanding flange 32' of the ring gear 32 provides a lock or idling period for the star wheel 40 throughout three quarters of each revolution of the ring gear 32. In this figure of the drawing, the arm 14 of the supporting structure 10 is shown as also carrying a slewing ring or slewing rail 41 over which the extending jack screw engaging rollers 26 carried by each of the supporting platforms 24 are adapted to roll as the platforms 24, when out of engagement with the upper ends of the jackscrews 27 and 28, are transferred from one trackway to the other. In other words, this slewing rail 41 retains a platform 24 upon the short length of trackway 22 carried by the bolster 18 during its transitional movement from one to the other side of the supporting structure 10.

Figure 5:
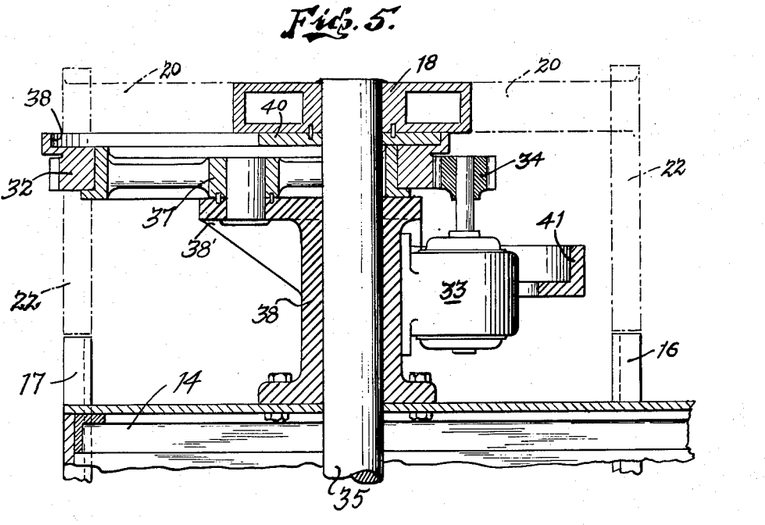
Figure 5 is a vertical sectional view taken along line V—V of Figure 4 looking in direction of arrows.

As will now be seen by referring to Figure 5 of the drawings, the yoke-like support 37 which carries the ring gear 32 is mounted upon an extending bracket 38' of a columnar support 38 here shown as secured to an upper surface of the arm 14 of the supporting structure. This columnar support 38 is also here shown as providing a support for the electric motor 33 which as previously stated operates through its pinion 34 to drive the ring gear 32. In this showing it will be also noted that the star wheel 40 is disposed above the ring gear 32 and within the limits of the upstanding flange 32' carried thereby. The yoke-like support 37 is pinned to its supporting bracket 38' and the star wheel 40 is pinned to the bolster 18 so as to turn as a unit therewith. The shaft 35 is also here shown extending downwardly and centrally through the columnar support 38 and through the arm 14 of the supporting structure. It should be here noted that the slewing rail 41 is disposed and arranged so that a platform 24 carried thereby will swing around and clear the driving motor 33.

Figure 6:
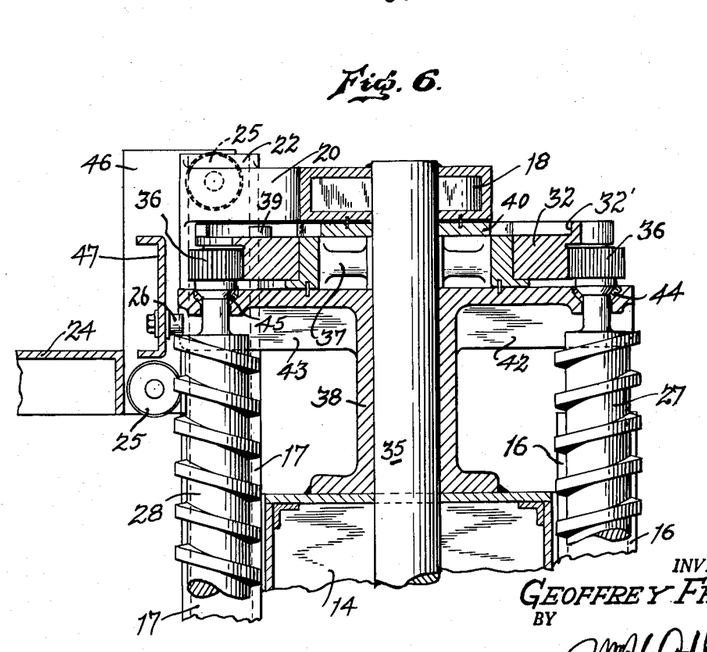
Figure 6 is a vertical sectional view taken along line VI—VI of Figure 4 looking in direction of arrows.

As will be noted upon referring to Figure 6 of the drawings the pedestal-like support 38, in addition to forming a support for the motor 33 and the yoke like support 37 for the ring gear 32, also has laterally and outwardly extending arms 42 and 43 from which the jackscrews 27 and 28 are respectively suspended. In this arrangement the laterally extending arms 42 and 43 of the supporting column 38 are provided with thrust type bearings 44 and 45 which are illustrated as conical in character, but it is to be understood that these bearings may take any other desired or required form. Suffice it to say that as here illustrated the jackscrews 27 and 28 are supported entirely by these bearing 44 and 45. However, as will later appear an additional support may be provided at their lower ends. With the bolster 18, illustrated as in a condition of dwell following a slewing operation, the roller 26 of the platform 24, as here shown in section, will be brought into a position for engagement with the upper end of the thread of the jackscrew 28. At this point it should be stated that the upper and lower ends of the threads of the jackscrews 27 and 28 may be mutilated so as to provide a substantially flat horizontal land that will provide a limited amount of leeway in the timing of the engagement and disengagement with the rollers 26 of the platforms 24. As a support for the jackscrew drive engaging rollers 26, each of the supporting platforms 24 are shown as having two spaced parallel side plates 46 with inwardly extending stub shafts upon which the trackway engaging rollers 25 are mounted. As a support for the jackscrew engaging roller 26, there is a horizontal extending channel iron 47 that is welded or otherwise secured between the side plates 46 so as to form a rigid unit. With the outer flange of the trackway engaging rails 22 extending oppositely and outwardly into close proximity with and between the two side plates 46 of the supporting platforms 24 it will be seen that the platform carrying rollers 25 will be held in positive engagement with the trackways 16 and 17 as the platforms are moved upwardly and downwardly therealong by the jackscrews 27 and 28.

Figure 7:
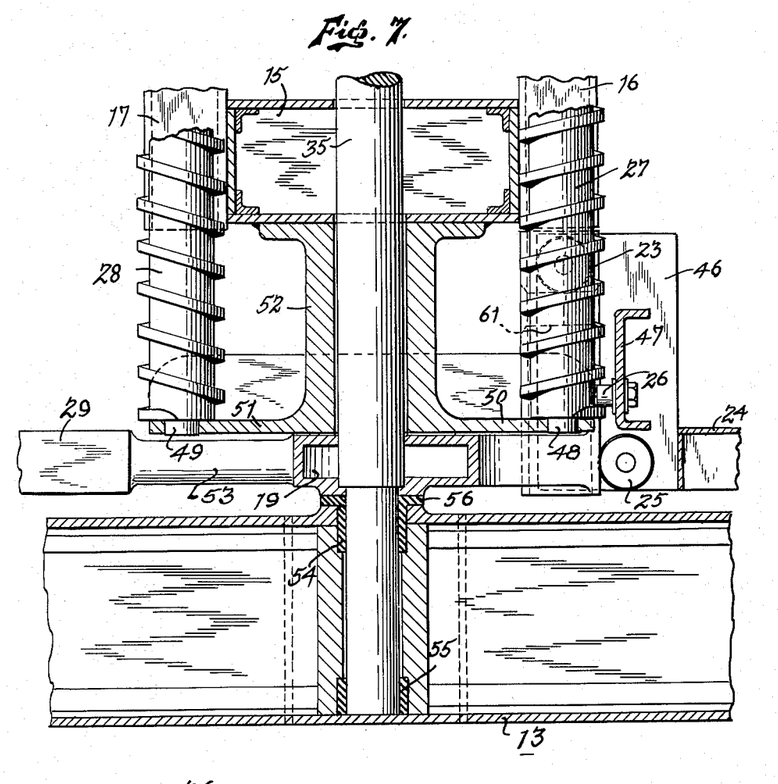
Figure 7 is a vertical sectional view similar to Figure 6, showing the arrangement employed at the base of the device.

By now referring to Fig. 7 of the drawings, it will be seen that the lower ends of the jackscrews 27 and 28 respectively have extensions 48 and 49 of reduced diameter that engage horizontally extending arms 50 and 51 carried by a cylindrical supporting member 52 secured to the under side of the lower lateral arm 15 of the supporting structure 10. In this arrangement the extending arms 50 and 51 are shown as operating to merely center the lower ends of these screws in alignment with the bearings 44 and 45 at the upper ends thereof but it will be understood that if required or desired these arms 50 and 51 may be also provided with a suitable centering and thrust type bearing so as to share the weight of the screws and the loads carried thereby with the bearings 44 and 45 previously described as forming the sole support for the jackscrews 27 and 28 as here illustrated. The shaft 35 extends through the supporting member 52 for engagement with the bolster 19 which as previously stated carries the shorter length of trackway 23 upon which the platforms 24 ride when being transferred from trackway 17 and back to trackway 16. The drive-over platform 29 at the base of the unit is also here shown as supported upon the bolster 19 by an integral arm or extension 53. At its lower end the shaft 35 is in turn mounted within bearings 54 and 55 that are suitably secured in the base portion 13 of the supporting structure 10. The upper bearing 54 has an annular flange about its upper end which forms a step bearing 56 upon which the bolster 19 and the shaft 35 are supported. The absence of a slewing rail or a similar fixed device for the support of the platforms 24 as they are transferred from one to the other side of the supporting column 10 is explained by the fact that the short length of trackway 23 carried by the bolster 19 is provided with a limiting stop which serves to retain the platform upon this shorter length of trackway during the transitional movement of the platforms thereby.

Figure 8:
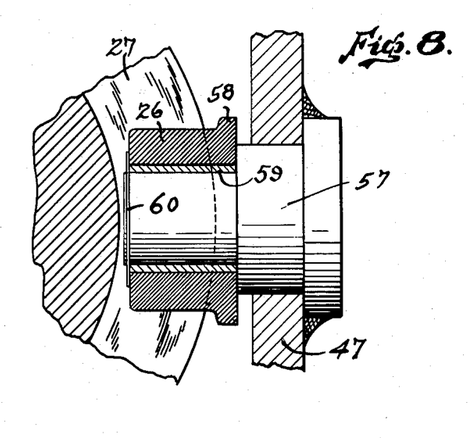
Figure 8 is an enlarged fragmentary view showing a detailed construction.

In Figure 8 of the drawings there is a more detailed showing of the manner in which the jackscrew thread engaging rollers 26 which provide the driving connection are mounted upon the movable platforms 24. In this arrangement a stub shaft 57 extends through and is welded to the laterally extending channel member 47 that is formed as an integral part of each of the platforms 24. The roller 26 has a guiding flange 58 at its inner end and turns upon a bearing 59. A snap ring 60 is employed to retain the roller 26 upon the extending end of the stub shaft 57.

Figure 9:
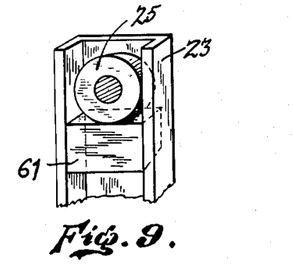
Figure 9 is a prospective view showing a further detail of the construction.

In Figure 9 there is shown a small portion of the upper end of one of the channel rails that form the short length of trackway 23 carried by the bolster 19. As here shown each of the rails of this short length of trackway 23 is provided with a fixed stop or abutment 61 at its upper end against which each of the upper rollers 25 of a particular supporting platform are adapted to engage when the platform 24 with its two sets of rollers are clear of the stationary trackways 16 and 17 and come into full engagement with the shorter length of trackway 23. In this manner, the stop 61 carried by the short length of trackway 23 serves in lieu of a slewing rail as a support for holding the platforms 24 upon the bolster 19 as they are moved around about from one of the other side of the supporting column 10.

Figure 10:
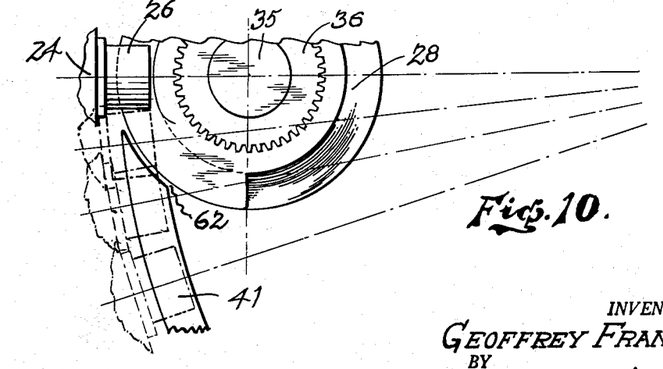
Figure 10 is a diagrammatic view illustrating conditions at several stages in the operation of the apparatus.

For a further detail of construction, reference is now made to Figure 10 of the drawings wherein the slewing rail 41 is shown as having its ends scarfed away as at 62 in such a manner that there is provided a close clearance between the outer perimeter of the jackscrews 27 and 28. This also insures a substantially uniform horizontal path of travel for the rollers 26 of the platforms 24 as its rollers are carried out of and into engagement at the upper ends of the jackscrews 27 and 28. In this diagrammatic illustration it will be noted that there is an overlap along the line of travel of the jackscrew engaging roller 26 as it is carried around about the axis of the bolster 18 during the initial and final stages of movement in the transition to and from the slewing rail 41 and the lands at the upper ends of the threads of the jackscrews 27 and 28.

As has been hereinbefore stated the principal object of my invention is to provide an automobile parking facility by which land values in congested metropolitan areas can be utilized for the parking of automobiles in a safe, convenient and practical manner with a minimum of ground space requirement and while I have illustrated and described a single unit having accommodations for only six automobiles, it is to be clearly understood that the apparatus may be constructed to accommodate a greater or lesser number of automobiles depending upon the nature of the installation requirements. Another advantage of the apparatus here illustrated and described is that it is well adapted for use in groups, each unit being one of a number of other similar units arranged one behind the other in a straight line or side by side in a bank if so desired.

Under normal operating conditions the supporting platforms 24 will preferably move in a counter-clockwise direction as viewed in Figure 1 of the drawings. However it is conceivable that the device may be continuously operated in the reverse direction by merely reversing the direction of rotation of the electric motor 33. This is possible as the ring gear 32 and the star wheel 40 are so designed that the intermittent driving connection which transfers the supporting platforms 24 from one to the other side of the column will operate in either direction. In either event it will be seen that if the cars or automobiles are driven onto the platforms 24 at either side of the column as viewed in Figure 1 these automobiles after passing over and through their transitional movement will be turned again so that their front ends will be pointing out. This means that the matter of parking is simplified as it avoids backing of the automobile and can be safely performed by the car owner. This also provides a great time saving advantage and in more congested areas where short-time parking is more prevalent a greater turnover will naturally result. While it is highly improbable, under normal operating conditions, that the automobiles will be deparked in the order of their parking, the fact that other automobiles will be moved in maneuvering a desired automobile into a deparking position is not serious for this tends to keep the entire unit in a condition of balance. However, should it be desired to depark an automobile on the up-travel side of the column and nearer the base than the top thereof the apparatus can be operated in a reverse direction so that a minimum movement of the platforms 24 will be required.

If it is now assumed that there are one or more of these units arranged in line one behind the other the drive-over deck or platform 29 will provide a surface over which an automobile may be driven through the front unit to other rearward parking units. In other words, since the false deck or drive-over platform 29 will always remain at floor level at one or the other side of the parking device it will provide for access and/or egress to and from parking units at the rear of a lot. While the lowermost platform 24 and the auxiliary or drive-over platform 29 are here illustrated as operating in the pit 30 it will be understood that in lieu of a pit the supporting structure 10 may be mounted directly upon the surface of the ground area where installed and surrounded by an elevated platform with an inclined ramp over which the automobiles could be driven into position upon the lift platforms 24. This gives the additional advantage that the parking unit as a whole can be installed on the surface with a platform approach in practically any location and where a pit 30 is desired the installation can be made with only a very shallow excavation.

While I have made no showing of a system of control for the electric motor 33, it will be apparent from the nature of the apparatus described that it will lend itself to a great many different types of control either by an attendant or automatic. At present it is contemplated that the motor 33 will be controlled by start and stop push buttons and limit switches in much the same fashion as is the practice in the control of automatic push button elevators. In such an arrangement a push button panel at the base of the apparatus will be provided with control buttons which when operated will bring a platform 24 with a particular automobile to the discharging point at the base of the apparatus. In this control provision may also be made to reverse the motor 33 in such a way that the platform having the desired automobile will travel the shortest distance to the base of the supporting column 10. It is believed that the operation of the mechanical aspects of this invention will be clearly understood from the preceding description and it therefore remains to be again briefly stated that when a single one of these units is installed in a particular location automobiles may be driven forward upon the supporting platforms 24 successively as they are brought into alignment with the surrounding ground area surface. Then as these supporting platforms 24 with an automobile thereupon arrive at the upper end of the apparatus the intermittent drive mechanism provided by the ring gear 32 and the star wheel 40 they will be slewed or rotated one at a time through an arc of 180 degrees to the other side of the supporting column 10 where the platform will then proceed downwardly until they are again at ground level where the automobile may be driven off the platform also in a forward direction. Under normal operating conditions when the device is entirely occupied by automobiles, the drive-over platform 29 may also be occupied by an automobile but the preferred procedure will be to use this auxiliary platform 29 as a drive-over passageway for automobiles that are to be driven to a point at the rear of the unit here shown, or as suggested above to a similar parking unit at the rear when a number of these units are installed in line at a particular location.

While I have, for the sake of clearness and in order to disclose the invention so that the same can be readily understood, described and illustrated a specific form and arrangement, I desire to have it understood that this invention is not limited to the specific form disclosed, but may be embodied in other ways that will suggest themselves to persons skilled in the art. It is believed that this invention is new and all such changes as come within the scope of the appended claims are to be considered as part of this invention.

Having thus described my invention, what I claim and desire to secure by Letters Patent is:

1. In an automobile parking facility, the combination of a supporting structure, stationary trackways extending vertically along opposite sides of said supporting structure, a plurality of lift platforms adapted and arranged to move vertically in spaced relation along said stationary trackways, a platform elevating jack screw supported by said structure in cooperating relation with each of said stationary trackways, means at the top of said supporting structure rotatable about a vertical axis having a vertically extending trackway adapted and arranged to be alternately placed in register with the stationary trackways at opposite sides of said supporting structure, means carried by said lift platforms forming a driving connection with the jack screws at the sides of said supporting column for moving said lift platforms upwardly or downwardly along said trackways depending upon which of said jack screws is engaged by said means, a supporting rail extending in a horizontal plane between the upper ends of said jack screws and engageable by said last means, a source of motive power for driving said jack screws in oppositely operating relation, and an intermittent driving connection between said source of motive power and the rotatable means at the top of said supporting structure operating in cooperation with said supporting rail for moving said lift platforms one at a time over said supporting rail from a jack screw at one side of said supporting structure to the jack screw at the other side thereof as said lift platforms are successively moved into full engagement with the vertically extending trackway of the rotatable means by either one of said jack screws.

2. In an automobile parking facility, the combination of a supporting structure, open ended trackways extending vertically along opposite sides of said supporting structure, a lift platform adapted and arranged to move vertically along and beyond the open ends of said stationary trackways, a jack screw extending parallel with and beyond the open ends of each of said trackways, means at the upper end of said trackways rotatable about a vertical axis having a platform supporting trackway adapted and arranged to be alternately placed in co-extending register with the open ends of the trackways at opposite sides of said supporting structure, means forming a driving connection between said jack screws and said platform for moving said lift platform upwardly or downwardly along said trackways depending upon which of said jack screws is engaged by said last means, a source of motive power for driving said jack screws in oppositely operating relation, an intermittent driving connection between said source of motive power and said means at the upper end of said trackways operating in timed relation with the vertical movement of said lift platform for rotating said means with its platform supporting trackway from one to the other side of said supporting structure when the means forming its driving connection reaches the upper end of the driving jack screw, and a horizontally extending arcuate rail disposed flush with the upper ends of said jack screws and engageable by the means forming the driving connection with said jack screws for maintaining said lift platform upon the platform supporting trackway of said first means as the means forming its driving connection disengages the driving jack screws.

3. In an automobile parking facility, the combination of a supporting structure, open ended trackways extending vertically along opposite sides of said supporting structure, a plurality of lift platforms adapted and arranged to move vertically in spaced relation along said stationary trackways, a jack screw extending parallel with and beyond the open ends of each of said trackways, rotatable means at the upper end of said trackways operating about a vertical axis having a lift platform supporting means adapted and arranged to be alternately placed in register with the open ends of the trackways at opposite sides of said supporting structure, means forming a driving connection between said jack screws and each of said lift platforms for moving said lift platforms upwardly or downwardly along said trackways as said jack screws are engaged by the means forming said driving connection, a source of motive power for driving said jack screws in oppositely operating relation, an intermittent driving connection for said rotatable means at the upper end of said trackways operating in timed relation with the vertical movements of said lift platforms for turning said means with its platform supporting means from one to the other side of said supporting structure when the means forming its driving connection reaches the upper end of an engaged jack screw, and a horizontally extending arcuate rail extending between and terminating flush with the upper ends of said jack screws for maintaining a lift platform upon the platform supporting means when the means forming its driving connection becomes disengaged with one or the other of said jack screws.

4. In an automobile parking device, the combination of a supporting structure, a horizontally extending bolster turnable about a vertical axis and disposed substantially centrally at the upper end of said structure, a second bolster mounted at the base of said structure for rotation in axial alignment with said first bolster, means forming a driving connection between said bolsters, pairs of spaced rails forming fixed open ended vertical trackways extending along opposite sides of said structure between said bolsters, a pair of spaced rails carried by said first bolster forming a movable platform supporting trackway in co-extending relation with the upper end of one of said fixed open ended trackways, a second pair of spaced rails carried by said second bolster forming a movable platform supporting trackway in co-extending alignment with the lower end of the rails forming the other of said fixed trackways, a plurality of lift platforms adapted and arranged to move in vertically spaced relation along said fixed trackways, two oppositely operating jack screws carried by said supporting structure for moving said lift platforms in spaced relation upwardly along the fixed trackway at one side and downwardly along the trackway at the other side of said structure, means operating independently of said jack screws for retaining a platform upon the platform supporting trackways carried by each of said bolsters, a source of motive power, a direct driving connection between said jack screws and said source of motive power, and means responsive to said direct driving connection forming an intermittent driving connection between said source of motive power and said bolsters operating in timed relation with the vertical movements of said lift platforms, whereby two of said platforms will be simultaneously transferred one at the upper end and one at the base to an opposite side of said supporting structure as said platforms are moved by said jack screws beyond the open ends of said fixed trackways.

5. In an automobile parking facility, the combination of a supporting structure, open ended stationary trackways extending vertically along opposite sides of said supporting structure, a plurality of lift platforms adapted and arranged to move vertically along said stationary trackways, a vertically disposed jack screw supported in cooperating parallel relation with each of said trackways, means at the upper and lower ends of said stationary trackways rotatable about a vertical axis having short lengths of trackway adapted and arranged to be alternately placed in co-extending register with said open ended stationary trackways, means carried by each of said lift platforms forming a driving connection between said jack screws and said platforms, said last means being operative to move said lift platforms beyond the ends of said open ended trackways and into full engagement upon the short lengths of trackway carried by the means rotatable about a vertical axis at the upper and lower ends of said open ended trackways, a supporting rail extending in a horizontal plane between the upper ends of said jack screws and engageable by the means forming the driving connection between said lift platforms and said jack screws, a stop carried by the trackway of said first means at the lower end of said stationary trackways, a source of motive power for driving said jack screws in oppositely operating relation, and an intermittent driving connection between said source of motive power and said first means for rotating said first means in timed relation with the vertical movements of said lift platforms, whereby the uppermost of said lift platforms at one side of said supporting structure with an automobile thereupon may be moved to the other side of said supporting column while the lowermost platform on the latter side of said supporting column with an automobile thereupon will be simultaneously moved to the side of said supporting column from which the uppermost of said platforms is moved and thus maintain a balance in the load upon said supporting structure.

6. In an automobile parking facility of the character described, the combination of a pair of spaced vertically disposed jack screws each having a driving pinion at one end thereof, a ring gear meshing with the pinions of said jack screws and forming a common drive therefor, motive power means for turning said ring gear about an axis spaced to one side and centrally between the axes of said jack screws, a bolster supporting shaft extending parallel with and in a plane common to said jack screws, an open ended vertically extending trackway for load supporting platforms disposed in cooperating relation with each of said jack screws, a plurality of load supporting platforms mounted for movement in spaced relation along said trackways each having a driving connection with one of said jack screws, a bolster mounted for horizontal rotation at the upper and lower ends of said bolster supporting shaft having a platform carrying means adapted and arranged to be alternately positioned in co-extending register with said vertical trackways, an intermittent driving connection between said ring gear and said bolster supporting shaft operating in timed relation with movements of said platforms along said trackways, and means for retaining a platform upon the platform carrying means of said bolsters as said bolsters are intermittently rotated whereby a platform moved upon each of said bolsters by the operation of said jack screws will be transferred from one to the other of said trackways at the upper and lower ends thereof.

7. In an automobile parking facility of the character described, the combination of a lift supporting structure disposed centrally in and extending upwardly from a circular pit, a fixed open ended lift accommodating trackway extending upwardly along opposite sides of said structure and terminating at their lower ends above the ground area surrounding said pit, a plurality of automobile supporting lift platforms mounted upon said open ended trackways for vertical movement in opposite directions along the trackways at the sides of said supporting structure, a bolster rotatable about a vertical axis mounted in said pit centrally with respect to said open ended trackways, a lift platform supporting means at one side of the axis of said bolster adapted and arranged to be alternately brought into register with the lower ends of the vertical trackways at the sides of said supporting structure, whereby a lift platform upon said bolster may be transferred from a position in alignment with one of said fixed open ended trackways to a position in alignment with the other of said open end trackways by a rotation of said bolster, and a flat surface platform also carried by said bolster at the other side of its axis forming a driveway area flush with the ground area surrounding said pit.

References Cited in the file of this patent

UNITED STATES PATENTS

| | | |
|---|---|---|
| 633,215 | Poulson | Sept. 19, 1899 |
| 1,228,162 | Anderson | May 29, 1917 |
| 1,852,633 | Ziebarth | Apr. 5, 1932 |
| 1,977,484 | Lagerquist et al. | Oct. 16, 1934 |
| 1,986,620 | Borden et al. | Jan. 1, 1935 |
| 2,148,932 | Fisher | Feb. 28, 1939 |
| 2,682,958 | Francis | July 6, 1954 |